(12) United States Patent
Dryburgh et al.

(10) Patent No.: US 8,950,810 B2
(45) Date of Patent: Feb. 10, 2015

(54) LATCH MECHANISM FOR AUTOMOTIVE SEAT ASSEMBLY

(71) Applicant: Toyo Seat USA Corp, Imlay City, MI (US)

(72) Inventors: John K. Dryburgh, North Branch, MI (US); Todd A. Demaray, Capac, MI (US); James E. Willing, Davison, MI (US)

(73) Assignee: Toyo Seat USA Corp., Imlay City, MI (US)

( * ) Notice: Subject to any disclaimer, the term of this patent is extended or adjusted under 35 U.S.C. 154(b) by 154 days.

(21) Appl. No.: 13/660,239

(22) Filed: Oct. 25, 2012

(65) Prior Publication Data
US 2013/0129413 A1 May 23, 2013

Related U.S. Application Data

(60) Provisional application No. 61/561,604, filed on Nov. 18, 2011.

(51) Int. Cl.
*B60N 2/04* (2006.01)
*B60N 2/015* (2006.01)
*B60N 2/30* (2006.01)

(52) U.S. Cl.
CPC ............ *B60N 2/01583* (2013.01); *B60N 2/305* (2013.01); *B60N 2205/20* (2013.01)
USPC ....................... 297/336; 297/378.13

(58) Field of Classification Search
USPC ...................... 297/378.13, 335, 336
See application file for complete search history.

(56) References Cited

U.S. PATENT DOCUMENTS

| | | | |
|---|---|---|---|
| 6,945,585 B1 * | 9/2005 | Liu et al. | 296/65.03 |
| 7,357,436 B2 | 4/2008 | Willing et al. | |
| 7,357,439 B1 * | 4/2008 | Morin | 296/78.1 |
| 7,575,280 B2 * | 8/2009 | Palomba et al. | 297/336 |
| 7,703,828 B2 * | 4/2010 | O'Connor et al. | 296/65.01 |
| 7,926,858 B2 * | 4/2011 | Otsuka | 292/216 |
| 7,959,205 B2 | 6/2011 | Paing et al. | |
| 8,029,030 B2 * | 10/2011 | Shimura et al. | 292/216 |
| 8,511,723 B2 * | 8/2013 | Otsuka | 292/216 |
| 2012/0025557 A1 * | 2/2012 | Lindsay et al. | 296/65.16 |

* cited by examiner

*Primary Examiner* — Sarah B McPartlin
(74) *Attorney, Agent, or Firm* — Quinn Law Group, PLLC.

(57) ABSTRACT

A latch mechanism for a seat of a vehicle includes a side plate, a hook, a locking pawl, an anti-rattle cam and a transfer plate. The side plate includes a first and second mounting bushing and a first and second pivot bushing. The hook is pivotably supported on the second pivot bushing, and includes a receiving portion configured to accept a striker. The hook is further configured to rotate between an engaged position and a released position. The locking pawl and anti-rattle cam are pivotably supported on the first pivot bushing and configured to rotate between a locked and an unlocked state. The locking pawl is configured to prevent the hook from rotating toward the released position when in a locked state. The transfer plate is configured to selectively urge the hook to rotate toward a released position.

20 Claims, 3 Drawing Sheets

LATCH MECHANISM FOR AUTOMOTIVE SEAT ASSEMBLY

TECHNICAL FIELD

The present invention relates generally to a latch mechanism for selectively restraining an automotive seating assembly to a vehicle.

BACKGROUND

In certain automotive seating configurations, it may be desirable for one or more of the interior occupant seating assemblies to be selectively decouplable from the vehicle body. For example, in multi-passenger vehicles, such as vans or sport-utility vehicles, second or third row occupant seating may be entirely removed and/or stowed to increase cargo storage space. Alternatively, second row seating may be selectively decoupled from the vehicle only at one end such that it may articulate away from the vehicle floor and provide easier ingress/egress to/from a third row of seating.

To provide for the selective decoupling, the occupant seating assembly may include a latch mechanism that is configured to engage and/or couple with a rigid portion of the vehicle. For example, the latch mechanism may be configured to selectively interconnect with a rod-like striker that may be integrated into the floor of the vehicle. In one embodiment, the striker may be provided beneath the surface of the vehicle floor, such as within a well-like channel. When engaged, the latch mechanism may be configured to grasp the striker in a manner that generally prevents the seating assembly from being lifted or separated from the vehicle.

SUMMARY

A latch mechanism for a seat of a vehicle includes a side mounting plate having a first and second mounting bushing and a first and second pivot bushing, a hook, a locking pawl, an anti-rattle cam, and a rotatable transfer plate. The hook may be pivotably supported on the second pivot bushing, and may be configured to rotate between an engaged position and a released position. The hook may include a receiving portion configured to accept and retain a striker. By securing the striker, the latch mechanism may be selectively affixed to a portion of the vehicle that includes the striker. For example, if the striker is affixed to the floor, the latch mechanism may be selectively secured to the floor. Alternatively, if the striker is affixed to a portion of the seat frame (e.g., in a folding-back seat), the latch mechanism may be used to rigidly lock the seatback in a position adapted to receive an occupant.

The locking pawl may be pivotably supported on the first pivot bushing of the side mounting plate and configured to rotate between a locked and an unlocked state. The locking pawl may be configured to prevent the hook from rotating toward the released position when in a locked state. An anti-rattle cam may similarly be pivotably supported on the first pivot bushing and may be configured to urge the hook to rotate toward an engaged position when in contact with the hook.

A rotatable transfer plate may be in selective contact with the hook, and may urge the hook to rotate into a released position. A spring may be coupled with the rotatable transfer plate and configured to urge the transfer plate into contact with the hook. Such contact between the transfer plate and the hook may urge the hook to rotate.

In one configuration, the anti-rattle cam includes a protrusion extending into the rotational path of the locking pawl. As such, the locking pawl may be configured to contact the protrusion when rotating from a locked state to an unlocked state such that the contact urges the anti-rattle cam to rotate in unison with the locking pawl.

The hook may include an anti-rattle pin extending from the hook in a direction transverse to the receiving portion. The anti-rattle cam may exert a force against the anti-rattle pin of the hook to urge the hook to rotate toward the engaged direction. In one configuration, the transfer plate defines a slot, and the anti-rattle pin and the second pivot bushing are arranged such that they extend through the slot.

A spring is disposed in tension between the locking pawl and the transfer plate, and may urge the locking pawl to rotate toward a locked state. A second spring may be disposed between the anti-rattle cam and the first mounting bushing, and may urge the anti-rattle cam to rotate towards the hook.

BRIEF DESCRIPTION OF THE DRAWINGS

FIG. 3B is a schematic side view of a hook of a latch mechanism.

FIG. 3C is a schematic side view of a transfer plate of a latch mechanism.

DETAILED DESCRIPTION

An embodiment of a latch mechanism for an automotive seat is described in U.S. patent application No. 61/561,604, filed 18 Nov. 2011, which is incorporated herein by reference in its entirety. Latch mechanism embodiments described below may be similar to those described in 61/561,604.

Figure 1:
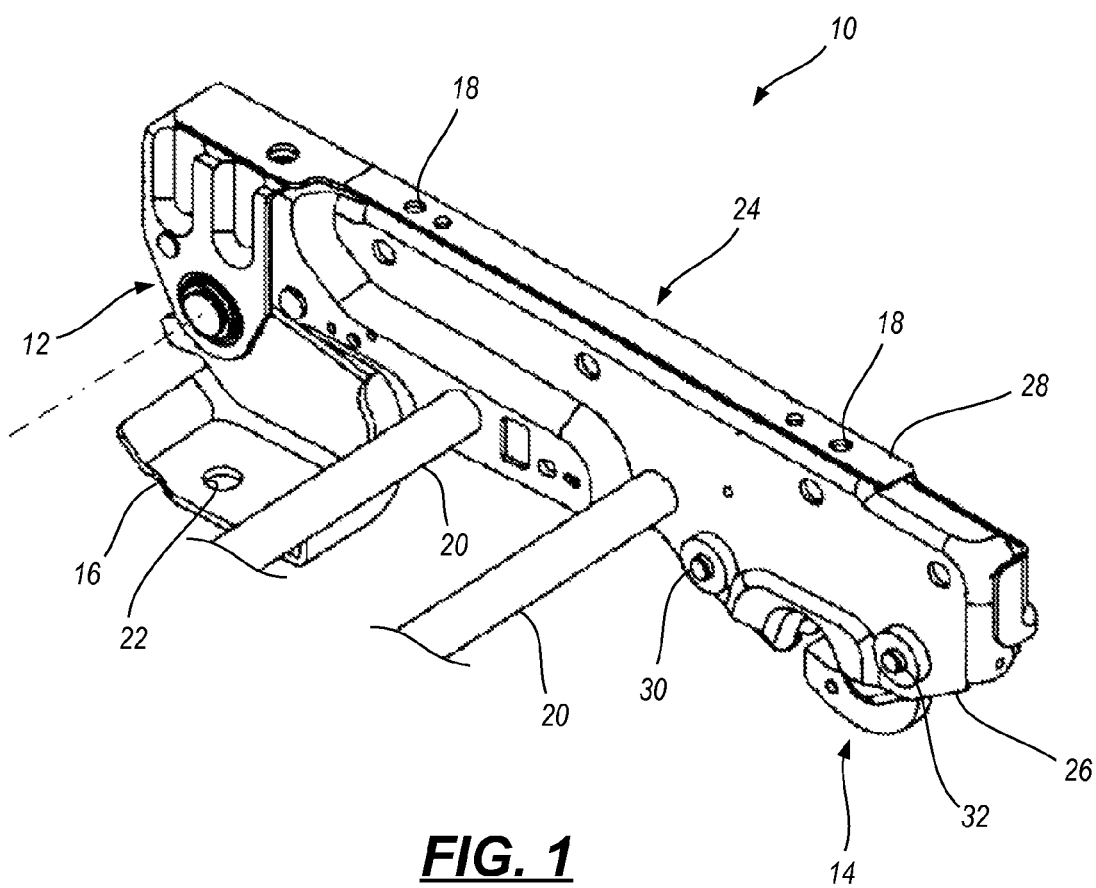
FIG. 1 is schematic perspective view of a frame member of a portion of a vehicle seat assembly that may be pivotably coupled with the floor of a vehicle interior.

Referring to the drawings, wherein like reference numerals are used to identify like or identical components in the various views, FIG. 1 schematically illustrates a frame member 10 of a vehicle seat assembly, which may generally include a pivot mechanism 12, a latch mechanism 14, and a mounting bracket 16. The frame member 10 may further include a plurality of attachment points (e.g., holes 18), to which other components of the seating assembly may be affixed. In one configuration, a subset of the attachment points may be used to affix a lower seating cushion (not shown), upon which a vehicle occupant may sit. While FIG. 1 illustrates only a single frame member, a second frame member may be coupled to the first frame member 10 in a mirrored orientation through one or more connecting rods 20.

In one configuration, the mounting bracket 16 may include a mounting hole 22 where the bracket 16 may be rigidly secured to the floor of the vehicle, for example, using one or more bolts or screws. Quite opposite to the rigidly constrained mounting bracket 16, the latch mechanism 14 may be freely capable of coupling/decoupling from the vehicle at the command of a user. For example, the seating assembly may include a release lever or handle (not shown) that may be actuated by a user to cause the latch mechanism to disengage from a restraining feature integrated into the vehicle. Likewise, a reasonable contact force between the latch mechanism 14 and the restraining feature (i.e., such as may be provided by the force of gravity) may cause the latch mechanism 14 to engage/couple with the vehicle via the restraining feature.

The pivot mechanism 12 may permit a portion 24 of the frame assembly to generally pivot with respect to the rigidly constrained mounting bracket 16. The pivot mechanism 12 and latch mechanism 14 may generally be disposed at opposite ends of the frame member 10 to allow a substantial portion of the seating assembly to articulate away from the floor of the vehicle. In this manner, for example, a second-row vehicle seat may be pivoted forward to provide easier passage to a third row. In another configuration, the pivot mechanism 12 and mounting bracket 16 may be substituted by a second latch mechanism (e.g., similar to latch mechanism 14), or simply with a rigid hook/latch. In this fashion, the seating assembly may be entirely removed from the vehicle at the command of a user.

The frame member 10 may include one or more rigid side walls (e.g., walls 26, 28) that may be coupled together, for example, to form a box-channel or C-channel. The side walls may be affixed using one or more screws, bolts, rivets, welds, or other known structural securing means. Alternatively, an extruded box-channel, stamped channel, or other single-piece structural member may similarly be used. In one configuration, the latch mechanism 14 may be a discrete component that may be secured to the side walls of the frame member 10 using one or more screws or bolts (e.g., mounting bolts 30, 32).

Figure 2A:
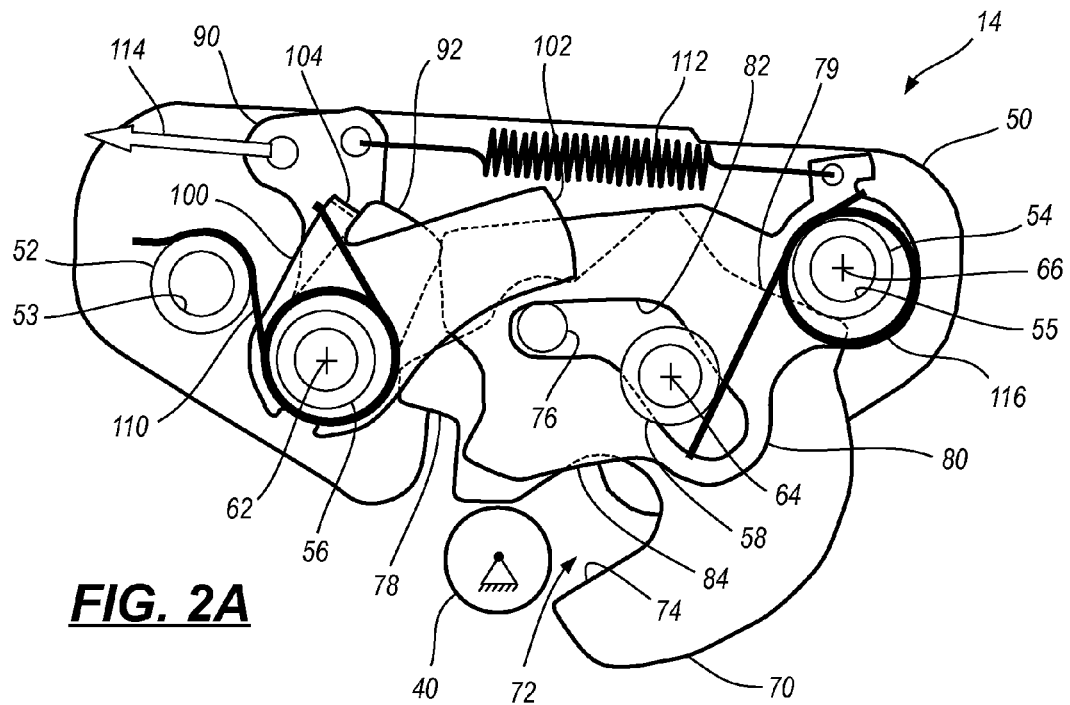
FIG. 2A is a schematic side view of a latch mechanism in a released state, adjacent a striker.
Figure 2B:
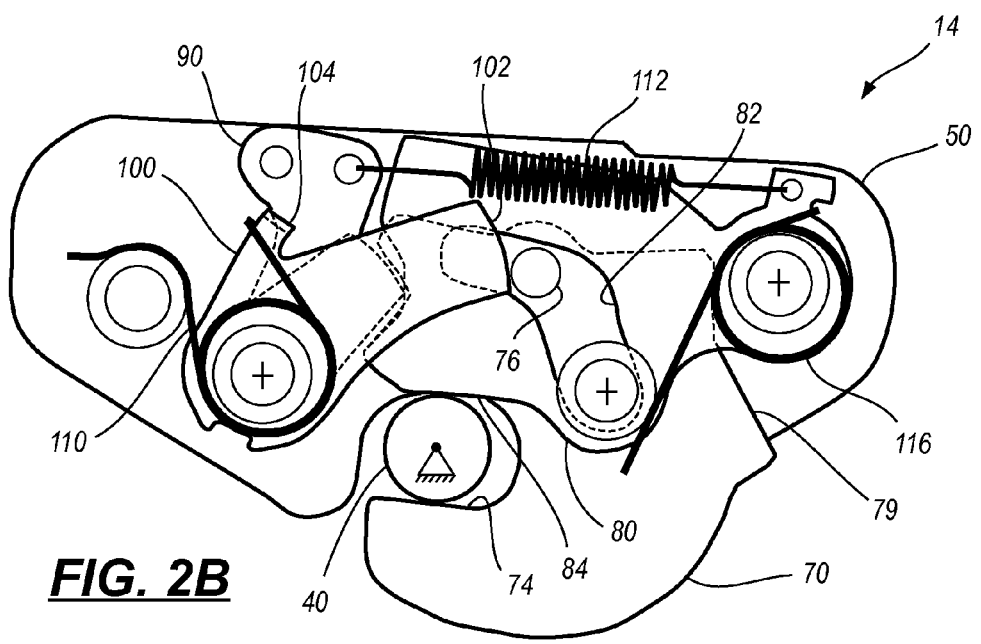
FIG. 2B is a schematic side view of the latch mechanism of FIG. 2A, provided in an engaged state about the striker.

FIG. 2A and FIG. 2B schematically illustrate an embodiment of a latch mechanism 14 that may be adapted to engage a restraining feature of a vehicle. As shown, the restraining feature may be a rod-like striker 40, which may generally be orthogonal to the latch mechanism 14. For clarity, FIGS. 3A-3E illustrate several components of the latch mechanism 14 that is provided in FIGS. 2A-2B.

The latch mechanism 14 may generally include at least one side plate 50 (FIG. 3A), upon which many of the mechanism components may be mounted. The mechanism components may generally include: a hook 70 (FIG. 3B) configured to directly engage/receive the striker 40; a transfer plate 80 (FIG. 3C) that is generally configured to urge the hook to a released state; a structural locking pawl 90 (FIG. 3D); and an anti-rattle cam 100 (FIG. 3E). In one configuration, a second side plate (not shown) may be disposed opposite the illustrated side plate 50, such that the hook 70, transfer plate 80, locking pawl 90 and anti-rattle cam 100 may be positioned substantially between the two side plates. Providing a generally enclosed mechanism (such as may be formed by two opposing side plates) may aid in preventing dirt, debris, and/or other objects from entering and/or interfering with the mechanism, and may further aid in supporting the various components.

Figure 3A:
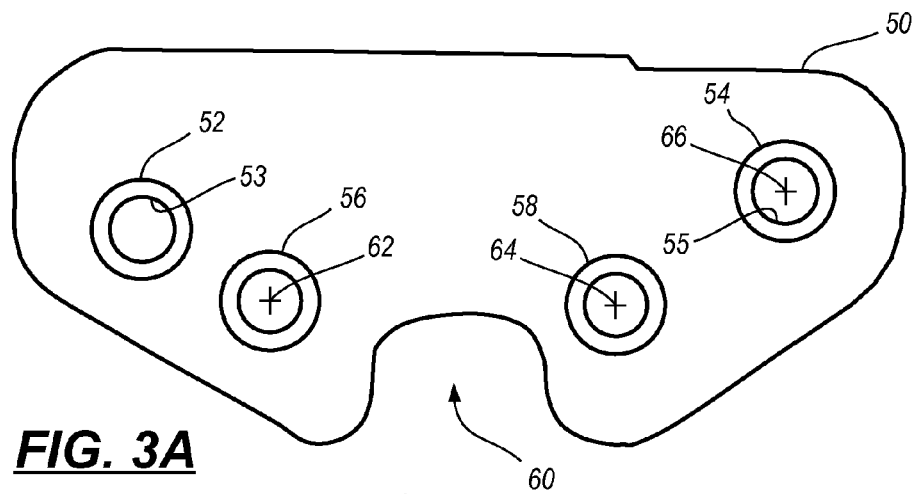
FIG. 3A is a schematic side view of a side plate of a latch mechanism.
Figure 3D:
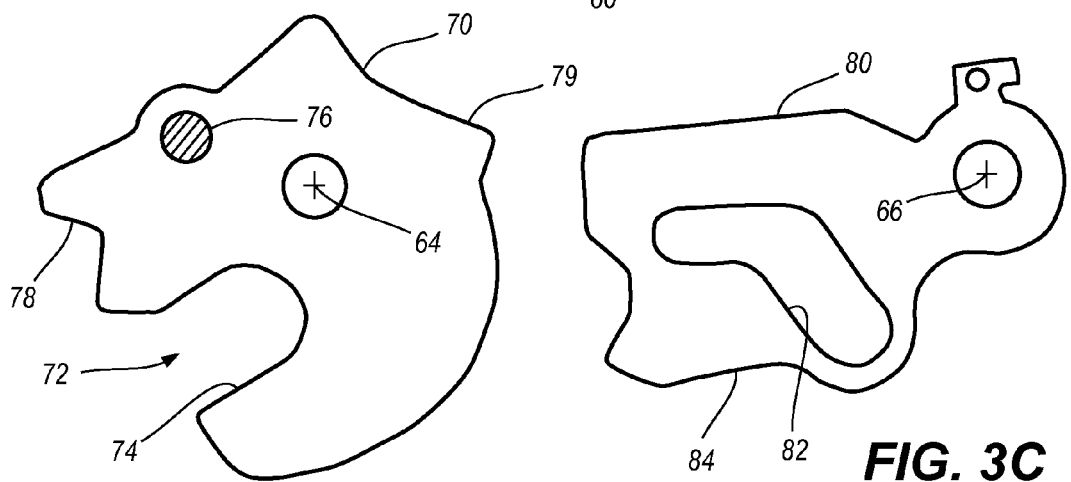
FIG. 3D is a schematic side view of a structural locking pawl of a latch mechanism.
Figure 3D:
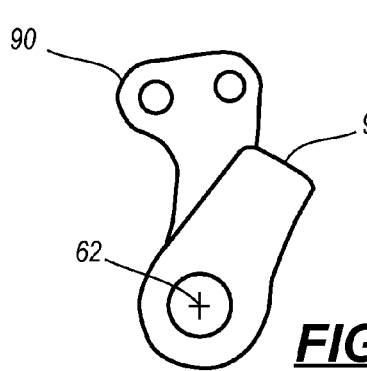
Figure 3E:
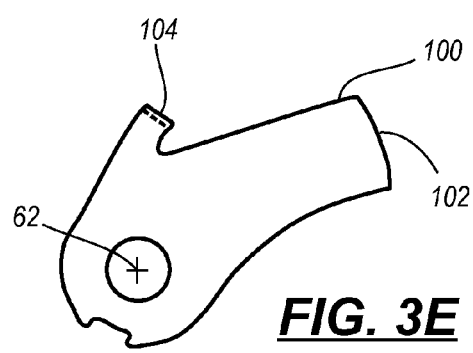
FIG. 3E is a schematic side view of an anti-rattle cam of a latch mechanism.

As generally illustrated in FIG. 3A, the side plate 50 may include a first and second mounting bushing 52, 54 and a first and second pivot bushing 56, 58. Each of the mounting bushings 52, 54 may respectively define an opening 53, 55 to accommodate a respective mounting bolt 30, 32. The first and second pivot bushings 56, 58 may each be configured to pivotably support one or more mechanism components, as will be described below. In one configuration, pivot bushings 56, 58 may have solid cores capable of withstanding substantial loading before appreciably deforming. The side plate 50 may further define an opening 60, which may generally allow the striker 40 to pass into more complete communication with the mechanism components.

As generally illustrated in FIG. 2A and 2B, the first pivot bushing 56 may pivotably support both the structural locking pawl 90 and the anti-rattle cam 100. As shown, the pawl 90 and cam 100 may each have an axis of rotation 62 that is generally coincident with the center of the bushing 56. Similarly, the second pivot bushing 58 may pivotably support the hook 70 such that the hook 70 may rotate about an axis of rotation 64 generally coincident with the center of the pivot bushing 58. Finally, the second mounting bushing 54 may support the transfer plate 80 such that the transfer plate 80 may rotate about an axis of rotation 66 generally coincident with the center of the mounting bushing 54.

The hook 70 may define a receiving portion 72 that is configured to engage and to accept the striker 40. More particularly, as shown in FIG. 2A, when the latch mechanism 14 is in a released state, the receiving portion 72 of the hook may generally point away from the side plate 50. As the latch mechanism 14 is lowered toward the floor of the vehicle, the hook 70 may contact the striker 40 and may be urged to rotate in a clockwise (locking) direction about its axis of rotation 64. During this rotation (i.e., the transition to FIG. 2B), the striker 40 may be drawn deeper within the receiving portion 72 of the hook, while the latching portion 74 of the hook 70 engages the underside of the striker 40.

Once the hook 70 has received the striker 40, as shown in FIG. 2B, the latch mechanism 14 may be prohibited from vertically lifting away from the floor of the vehicle without the hook 70 rotating in a counterclockwise direction. Such a rotation may be prohibited by the physical interference between the anti-rattle cam 100 and a corresponding anti-rattle pin 76 that may protrude from the side of the hook 70. The counterclockwise rotation of the hook 70 may further be prevented by a physical interference between a contact surface 92 of the structural locking pawl 90 and a similar locking surface 78 of the hook 70.

As shown in FIG. 2B, when in a locked configuration, the contact surface 92 of the locking pawl 90 may be slightly separated from the locking surface 78 of the hook 70. In this manner, the pawl 90 may be used as a secondary restraint, should the anti-rattle cam 100 yield. In one embodiment, the anti-rattle cam 100 may be purposefully designed to yield if exposed to a load above a predetermined threshold. In such an instance, the structural locking pawl 90 may then be relied on as the primary locking device when above that load threshold.

The anti-rattle cam 100 and the structural locking pawl 90 may each be urged in a clockwise (locking) direction by a separate biasing device. As shown, the anti-rattle cam 100 may be urged to rotate in a clockwise direction by a torsional spring 110 that may exert a reactionary force against the first mounting bushing 52. The torsional spring 110 may, for example, be hooked over a portion of the cam 100. Separately, the structural locking pawl 90 may be urged to rotate in a clockwise direction by a linear coiled spring 112 provided in tension with the transfer plate 80.

During the locking process, as shown in FIG. 2B, the clockwise rotation of the anti-rattle cam 100 (at the urging of the torsional spring 110) may cause a sloped surface 102 of the cam 100 to contact and exert a force against the anti-rattle pin 76 of the hook 70. This force may urge the hook 70 to further rotate in a clockwise (locking) direction and cinch the striker 40 against the side plate 50. By forcibly loading the hook 70 against the striker 40, any vibrations and/or rattles that may have ordinarily been picked up and/or transmitted by the hook 70 may be dampened or eliminated.

During a releasing process, as generally illustrated in FIG. 2A, a user supplied force 114 may urge the structural locking pawl 90 to rotate in a counterclockwise (releasing) direction and to counteract the clockwise (locking) force of the linear coiled spring 112. As the structural locking pawl 90 begins to rotate/release, a portion of the pawl 90 may contact an interference 104 provided on the anti-rattle cam 100, and induce a similar counterclockwise rotation of the cam 100. The interference 104 on the anti-rattle cam 100 may be, for example, a protrusion, a peg, a folded over tab, a hook, or any similar non-coupling interference. The user supplied force 114 may come from, for example, a pull cable coupled with a lever/handle adjacent the seat cushion, though should be strong enough to overcome the spring forces of the torsional spring 110 and the linear spring 112.

As mentioned above, the transfer plate 80 may be pivotably mounted on the second mounting bushing 54, and may be urged to rotate in a counterclockwise (releasing) direction by the linear coiled spring 112. A second torsional spring 116 may further urge the transfer plate 80 to rotate in a counterclockwise (releasing) direction while exerting a reactionary force against the second pivot bushing 58.

The transfer plate 80 may include a slot 82 that may be configured to accommodate and/or receive both the anti-rattle pin 76 of the hook 70 and the second pivot bushing 58. When in a released state, such as in FIG. 2A, the transfer plate 80 may apply a counterclockwise (releasing) force to the hook 70 via the anti-rattle pin 76. This force may urge the hook 70 to fully rotate into a position where it may readily accept the striker 40. To prevent the hook 70 from over rotating, however, a surface 79 of the hook 70 may be configured to contact the mounting bushing 54 and limit the hook's total rotation. Alternatively, one or more tabs, posts or other similar protrusions may extend from the side plate 50 to restrain the hook 70 from over rotating in a counterclockwise direction.

Prior to receiving the striker 40, in one configuration, a surface 84 of the transfer plate 80 may extend slightly beyond the edge of the hook 70. As the striker 40 is received by the hook 70, the striker 40 may then rotate the transfer plate 80 in a clockwise manner until the surface 84 is substantially flush with the hook 70. This rotation may result in the transfer plate 80 breaking contact with the anti-rattle pin 76, while also applying an elastic, spring loading force against the striker 40. Said another way, the striker 40 may balance the force of the torsional spring 116 and the linear spring 112 on the transfer plate 80. Removing the counterclockwise force on the hook 70, which was applied via the transfer plate 80, may then allow the anti-rattle cam 100 to more effectively tighten the hook 70 without the need to overcome existing torques.

While extending surface 84 initially beyond the hook 70 may dampen the ingress of the striker 40, in an alternate configuration, the surface 84 of the transfer plate 80 may generally align with or be situated above the hook 70 prior to the receipt of the striker 40. Due to the off-set axes of rotation 64, 66, a similar separation of the anti-rattle pin 76 and the transfer plate 80 may be experienced to remove the counterclockwise loading from the hook 70.

While the present description of the latching mechanism 14 is generally made with respect to a floor latch that may selectively couple a frame member to a vehicle floor (i.e., where the striker is affixed to the floor of the vehicle), the latch 14 may similarly be used for other vehicle seating applications. For example, in one configuration, the latch mechanism 14 may be used to selectively couple the back frame of a seating assembly with the lower portion of a seat frame (i.e. such as where the back frame may collapse from a substantially vertical orientation to a substantially horizontal orientation against the lower seat frame). In such a configuration, the striker may be affixed to the seat of the vehicle. In another configuration, the latch mechanism 14 may be used to couple the back frame of a seating assembly with the frame of the vehicle, such as with a folding rear seat of a sedan (i.e., enabling a cargo pass-through to the trunk). As such, the structure of the latch mechanism 14 should not be limited to any one particular application within the vehicle.

While the best modes for carrying out the invention have been described in detail, those familiar with the art to which this invention relates will recognize various alternative designs and embodiments for practicing the invention within the scope of the appended claims. It is intended that all directional references are included solely to provide clarity in the description of the illustrated figures. Such references should not be read to impart any necessary orientation or other limitations to the structure of the claimed invention. All matter contained in the above description or shown in the accompanying drawings shall be interpreted as illustrative only and not as limiting.

The invention claimed is:

1. A latch mechanism for a seat of a vehicle, the latch mechanism comprising:
   a side plate including a first and second mounting bushing and a first and second pivot bushing;
   a hook pivotably supported on the second pivot bushing, the hook including a receiving portion configured to accept a striker, and configured to rotate between an engaged position and a released position; and
   a locking pawl pivotably supported on the first pivot bushing and configured to rotate between a locked and an unlocked state, the locking pawl configured to prevent the hook from rotating toward the released position when in the locked state;
   an anti-rattle cam pivotably supported on the first pivot bushing and configured to urge the hook to rotate toward an engaged position; and
   a transfer plate pivotably supported on the second mounting bushing and configured to selectively urge the hook to rotate toward a released position.

2. The latch mechanism of claim 1, wherein the anti-rattle cam includes a protrusion extending into the rotational path of the locking pawl; and
   wherein the locking pawl is configured to contact the protrusion when rotating from a locked state to an unlocked state such that the contact urges the anti-rattle cam to rotate in unison with the locking pawl.

3. The latch mechanism of claim 1, wherein the hook includes an anti-rattle pin extending from the hook in a direction transverse to the receiving portion.

4. The latch mechanism of claim 3, wherein the anti-rattle cam is configured to exert a force against the anti-rattle pin of the hook, the force urging the hook to rotate toward the engaged direction.

5. The latch mechanism of claim 3, wherein the transfer plate defines a slot; and
   wherein the anti-rattle pin and the second pivot bushing extend through the slot defined by the transfer plate.

6. The latch mechanism of claim 1, further comprising a spring disposed in tension between the locking pawl and the transfer plate; and
   wherein the spring urges the locking pawl to rotate toward a locked state.

7. The latch mechanism of claim 1, further comprising a spring disposed between the anti-rattle cam and the first mounting bushing; and
   wherein the spring urges the anti-rattle cam to rotate towards the hook.

8. The latch mechanism of claim 1, wherein the striker is affixed to the interior floor of the vehicle.

9. The latch mechanism of claim 1, wherein the striker is affixed to the seat of the vehicle.

10. The latch mechanism of claim 1, wherein the locking pawl is configured to receive a user supplied force to urge the locking pawl to rotate into an unlocked state.

11. A latch mechanism for a seat of a vehicle, the latch mechanism comprising:
   a side plate including a first and second mounting bushing and a first and second pivot bushing;
   a hook pivotably supported on the second pivot bushing, the hook including a receiving portion configured to accept a striker, and configured to rotate between an engaged position and a released position; and
   a locking pawl pivotably supported on the first pivot bushing and configured to rotate between a locked and an unlocked state, the locking pawl configured to prevent the hook from rotating toward the released position when in the locked state;
   an anti-rattle cam pivotably supported on the first pivot bushing and configured to urge the hook to rotate toward an engaged position;
   a rotatable transfer plate in selective contact with the hook and pivotably supported on the second mounting bushing; and
   a spring coupled with the rotatable transfer plate and configured to urge the transfer plate into contact with the hook, wherein the contact between the transfer plate and the hook urges the hook to rotate toward a released position.

12. The latch mechanism of claim 11, wherein the anti-rattle cam includes a protrusion extending into the rotational path of the locking pawl; and
   wherein the locking pawl is configured to contact the protrusion when rotating from a locked state to an unlocked state such that the contact urges the anti-rattle cam to rotate in unison with the locking pawl.

13. The latch mechanism of claim 11, wherein the hook includes an anti-rattle pin extending from the hook in a direction transverse to the receiving portion.

14. The latch mechanism of claim 13, wherein the anti-rattle cam is configured to exert a force against the anti-rattle pin of the hook, the force urging the hook to rotate toward the engaged direction.

15. The latch mechanism of claim 13, wherein the transfer plate defines a slot; and
   wherein the anti-rattle pin and the second pivot bushing extend through the slot defined by the transfer plate.

16. The latch mechanism of claim 11, wherein the spring is disposed in tension between the locking pawl and the transfer plate; and
   wherein the spring further urges the locking pawl to rotate toward a locked state.

17. The latch mechanism of claim 11, further comprising a second spring disposed between the anti-rattle cam and the first mounting bushing; and
   wherein the second spring urges the anti-rattle cam to rotate towards the hook.

18. The latch mechanism of claim 11, wherein the striker is affixed to the interior floor of the vehicle.

19. The latch mechanism of claim 11, wherein the striker is affixed to the seat of the vehicle.

20. The latch mechanism of claim 11, wherein the locking pawl is configured to receive a user supplied force to urge the locking pawl to rotate into an unlocked state.

* * * * *